April 30, 1968
B. B. MECKEL
3,380,249
PROPULSIVE DEVICE
Filed Feb. 21, 1966
4 Sheets-Sheet 1
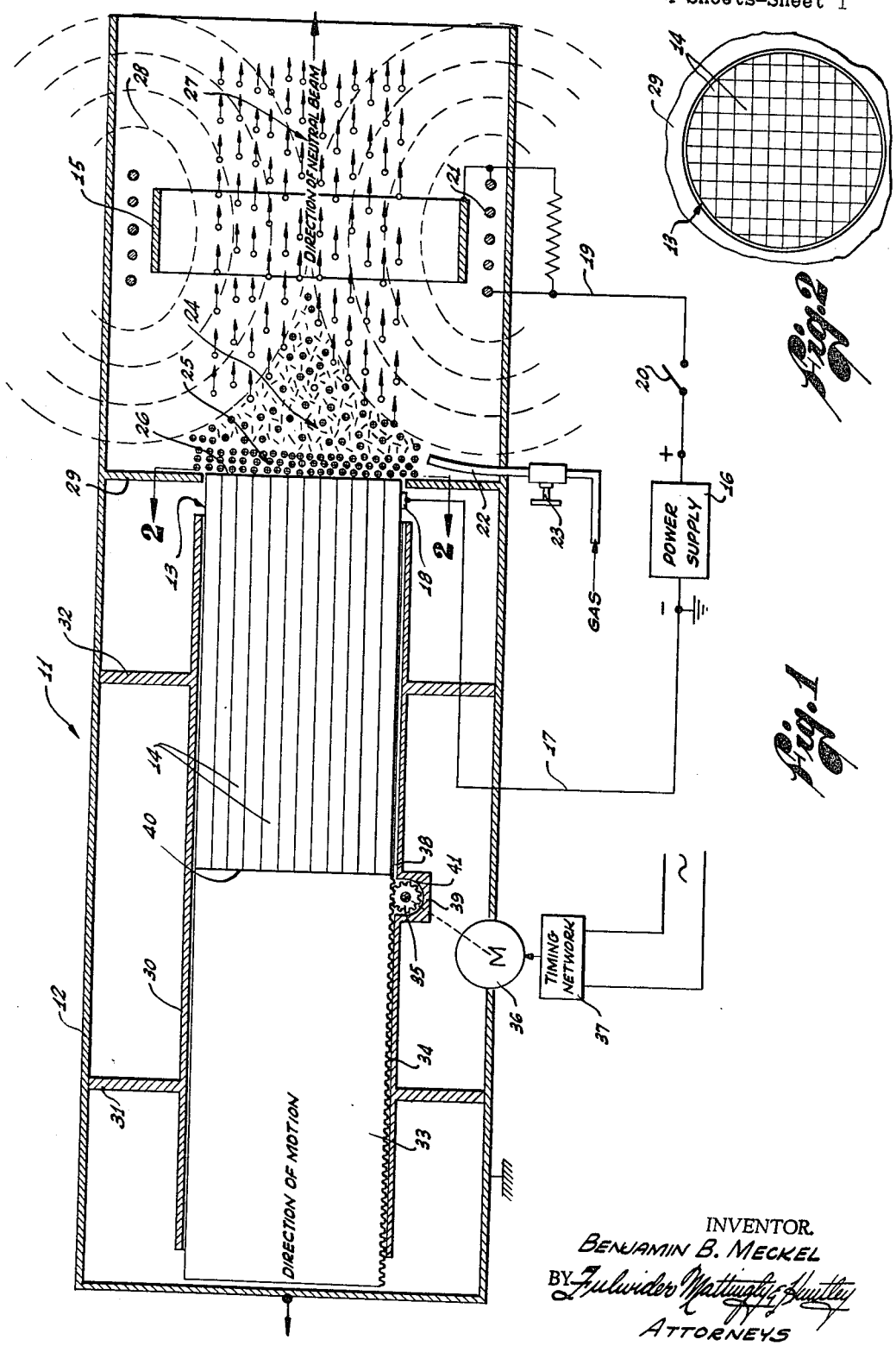
INVENTOR.
BENJAMIN B. MECKEL
BY Fulwider Mattingly Huntley
ATTORNEYS April 30, 1968     B. B. MECKEL     3,380,249
PROPULSIVE DEVICE
Filed Feb. 21, 1966     4 Sheets-Sheet 2
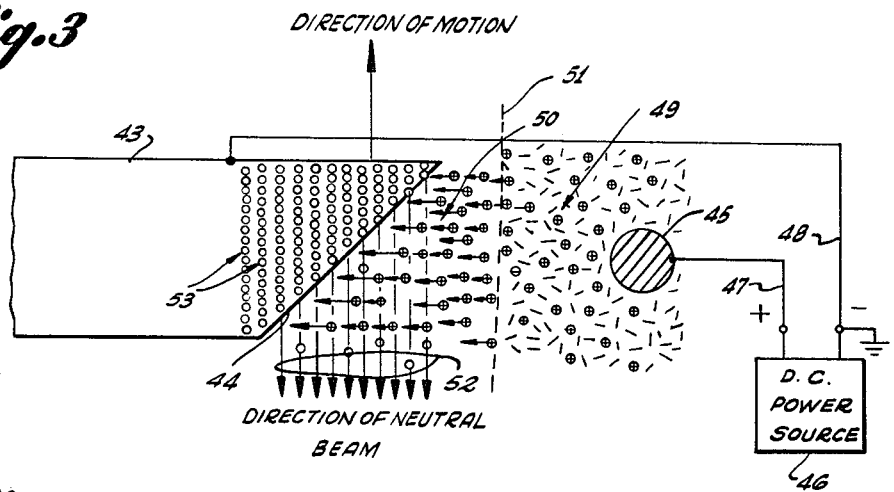
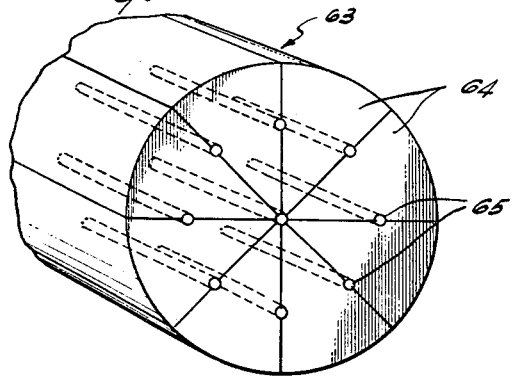
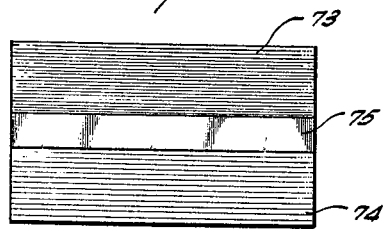
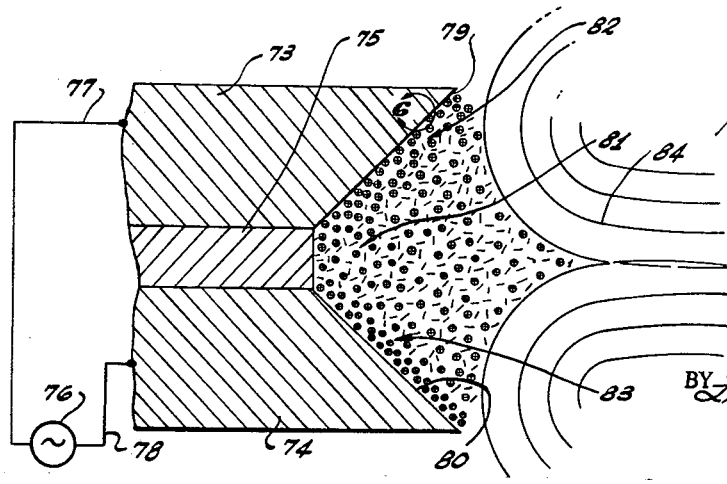
INVENTOR.
BENJAMIN B. MECKEL
BY Fulwider Mattingly & Huntley
ATTORNEYS

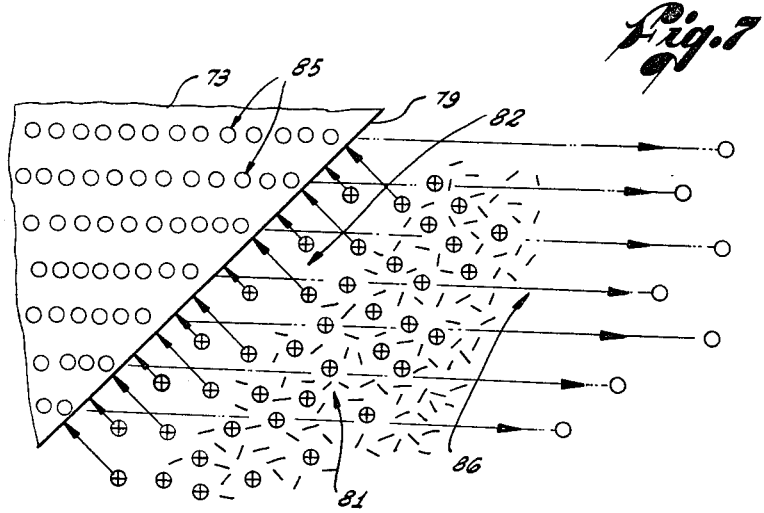
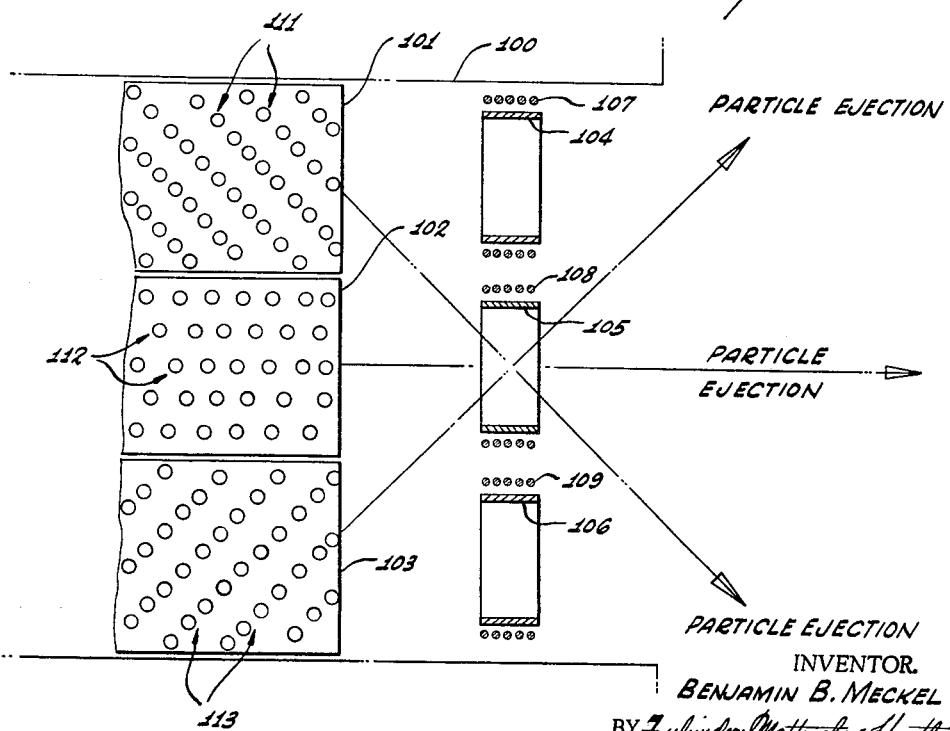

April 30, 1968  B. B. MECKEL  3,380,249
PROPULSIVE DEVICE
Filed Feb. 21, 1966  4 Sheets-Sheet 4
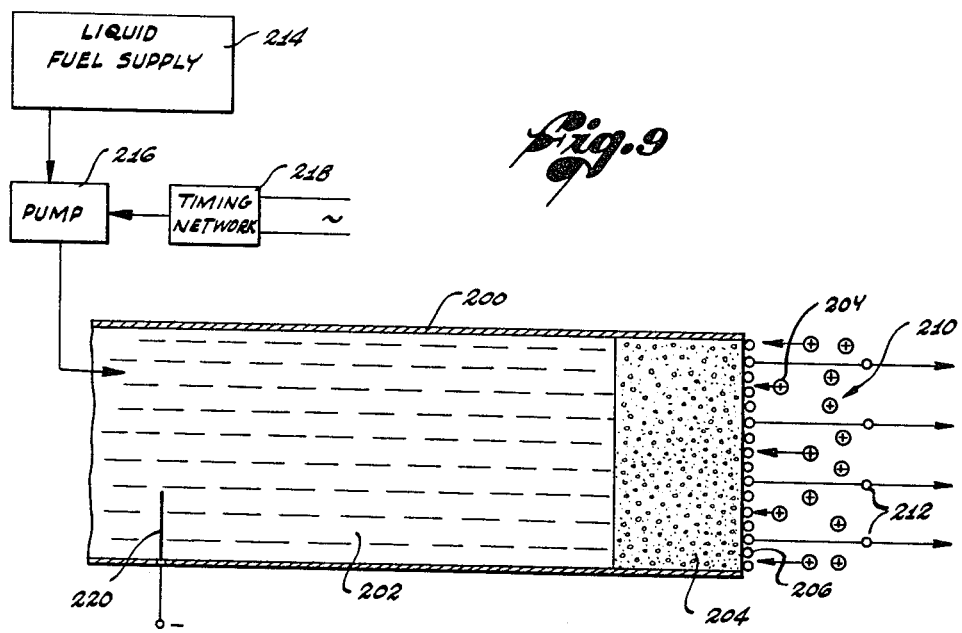
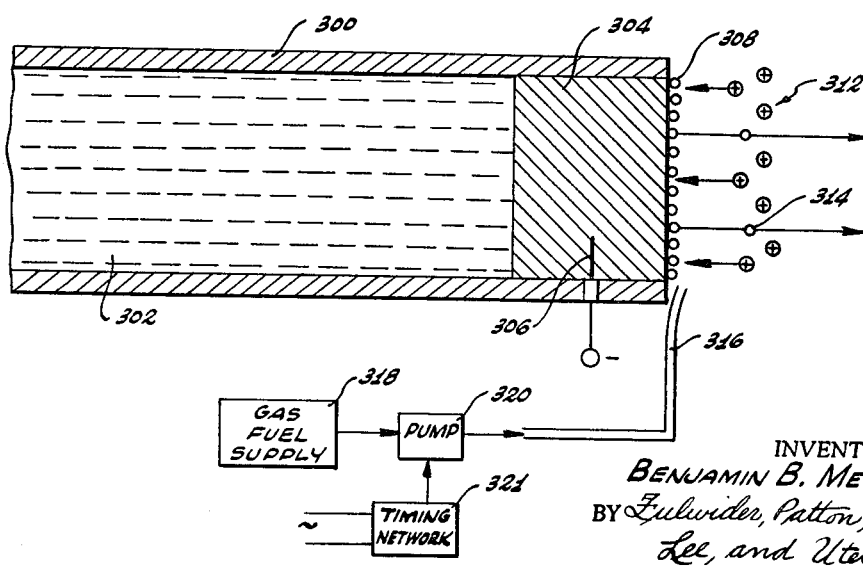
INVENTOR.
BENJAMIN B. MECKEL
BY Fulwider, Patton, Rieber
Lee, and Utecht
ATTORNEYS

United States Patent Office 3,380,249
Patented Apr. 30, 1968

3,380,249
PROPULSIVE DEVICE
Benjamin B. Meckel, Los Angeles, Calif., assignor to Physics Technology Laboratories, Inc., La Mesa, Calif., a corporation of California
Continuation-in-part of application Ser. No. 180,212, Mar. 13, 1962. This application Feb. 21, 1966, Ser. No. 532,519
22 Claims. (Cl. 60—202)

This application is a continuation-in-part of co-pending application, Ser. No. 180,212, filed Mar. 13, 1962, now abandoned, inventor Benjamin B. Meckel, for Propulsive Device.

This invention relates generally to propulsion systems, and more particularly to a new and improved propulsive method and apparatus wherein a beam of neutral particles is utilized to generate thrust.

In recent years, there have been vast expenditures and tremendous research and development efforts in the area of space technology. In this regard, there has been considerable concentration upon the problem of developing propulsive systems for propelling vehicles in outer space. After such vehicles have overcome strong gravitational forces by conventional high-thrust propulsion means, there no longer exists a need for a high-thrust device. At this stage of a flight mission, systems having much lower thrust-to-weight ratios are suitable for reliably and inexpensively propelling large payloads over long distances through space. In this connection, electrical propulsion techniques, i.e., ionic and plasma propulsion, offer prospects of greatly increased payload capacity for such outer space probes.

It is well known in the propulsion art that, for any given payload, the total flight time required to complete a specific flight mission is dependent almost entirely upon the propulsive thrust level. However, the size of the payload, i.e., the mass which can be carried, is dependent almost entirely upon the specific impulse of the propulsive system. Typical specific impulse requirements for a lunar mission would probably range from 1,500 to 5,000 sec., whereas specific impulse well in excess of 5,000 sec. would be desirable for interplanetary flights. Such values of specific impulse are well beyond the present limits of conventional chemical propellants which are utilized primarily to satisfy high-thrust requirements, such as overcoming gravitational forces.

Recent interest in electrical propulsion systems derives from the ability of such systems to theoretically produce specific impulses in the range of 1,000 to 10,000 sec. This feature, together with low engine weight, makes electrical propulsion systems well suited to the tasks of satellite attitude control and orbit changes, as well as providing primary propulsion for the upper stages of deep space probes which have been boosted into orbit by the high thrust propulsive means.

Unfortunately, the electrical propulsion systems proposed to date have each suffered from one or more of a plurality of deleterious effects which are both difficult and expensive to overcome. Among the difficulties encountered have been space charge limitations upon exhaust potential and current density, as well as beam spreading and charge build-up directly upon the body being propelled. These problems require for their solution the incorporation of complex neutralization expedients directly into the engine with consequent increased power requirements, increased engine weight and reduction in overall operating efficiency.

Another fundamental limitation upon many electrical propulsion systems is the erosion of ion accelerating electrodes and other engine components by sputtering due to impingement of ions upon the components. Sputtering studies have shown that as many as ten atoms of an electric engine electrode can be eroded away by the impact of a single cesium ion. Such electrode erosion can ruin the operation of the engine during the typically long periods of time for which such an engine might be operated during a deep space flight mission. Hence, in order to extend the engine capability for long periods of operation, the propulsive system must employ complex and expensive ion optical expedients to minimize the sputtering phenomenon.

Other difficulties encountered with electrical propulsion systems have been overall system complexity, the physical size of the electrical engine configuration, as well as the facility with which starting and stopping of the operation of such units may be accomplished.

Accordingly, it is an object of the present invention to provide a novel propulsion method and apparatus which overcomes the above and other disadvantages of the electrical propulsive systems heretofore available.

Another object is to provide a novel propulsive device which eliminates the need for exhaust beam accelerating electrodes and charge neutralization expedients.

A further object of the invention is the provision of a simplified propulsive system which generates thrust by means of a neutral particle beam.

Still another object is to provide a novel neutral particle beam generating apparatus which harnesses the sputting phenomenon for the production of thrust.

Yet another object of this invention is the provision of a compact propulsive system capable of satisfying a wide range of thrust and specific impulse requirements.

Another object is to provide a propulsive system capable of long periods of operation and in which starting and stopping of its operation is readily facilitated.

The above and other objects of this invention will be better understood by reference to the following detailed description when considered in connection with the acompanying drawings wherein:

FIGURE 1 is a combined schematic and sectional view illustrating the arrangement of elements for one embodiment of a neutral particle propulsive device in accordance with the invention;

FIGURE 2 is an end view of the fuel rod as viewed in the direction of the line 2—2 of FIGURE 1;

FIGURE 3 is a schematic and sectional view of a portion of a D-C neutral particle engine, and illustrates a fuel rod shaped to effect thrust at an angle to its axis;

FIGURE 4 is a fragmentary perspective view of a fuel rod of my invention that is seeded with rods of another material for the production of ionizable gas;

FIGURE 5 is a fragmentary, longitudinal sectional view of a fuel rod arrangement for an A-C neutral particle engine, in accordance with the invention;

FIGURE 6 is an end view of the fuel rod arrangement of FIGURE 5;

FIGURE 7 is an enlarged view of a portion of the upper fuel rod surface shown in FIGURE 5, and illustrates the arrangement of the fuel rod crystal structure with respect to the bombarding ions and the ejected neutral particle beam;

FIGURE 8 is a combined schematic and sectional view of an engine arrangement, in accordance with the present invention, which enables the propulsive thrust to be vectored in a plurality of directions;

FIGURE 9 is a combined schematic and sectional view of an engine arrangement, in accordance with the present invention, utilizing a liquid fuel which is sputtered; and FIGURE 10 is a combined schematic and sectional view of an engine arrangement, in accordance with the present invention, utilizing a gas as fuel.

Referring now to the drawings, and particularly to FIGURES 1 and 2 thereof, there is shown a propulsive vice 11 which harnesses the sputtering phenomenon, heretofore considered to be an undesirable condition in such engines, for the generation of a thrust-producing neutral particle beam 27. The phenomenon of sputtering refers to the disintegration or erosion of material which occurs when ions strike a surface. In this regard, the propulsive device 11 embodies apparatus for continuously bombarding the surface of a metal with positive ions to induce sputtering and produce a neutral exhaust beam comprising atoms ejected from the sputtered surface.

The mechanism by which an atom is ejected from a metal surface has been shown to be a momentum transfer process where an impinging ion, accelerated at high velocity to a conducting surface by electrostatic attraction, gives up its energy to the surface atoms by impact. In this manner, atoms are ejected from the bombarded surface by direct transfer of energy. Hence, the ejected atoms leave the sputtered surface with energies well above typical thermal levels and, depending upon the crystal orientation or lattice arrangement, in preferential directions. Typical velocities for particles ejected from sputtered metallic surfaces are of the order of $10^6$ cm./sec. and it is possible to alter this velocity by several factors in either direction.

The engine 11 is shown to comprise an outer housing 12 in the form of a rocket tube of any suitable structural material, such as steel or the like. Although a cylindrical form may be desired, the housing 12 may assume any practical outer configuration. Positioned within the housing 12 is a fuel element 13 comprising an assembly of individual monocrystal metal fuel rods 14. As best observed in FIGURE 2, the individual fuel rods 14 are cut or otherwise shaped to configurations which enable these rods to be fitted together, side by side, to form the larger single fuel element 13.

Therefore, the size of the fuel element 13, and hence of the ejected atom beam 27, depends upon the number of fuel rods 14 which are assembled together. Moreover, in assembling the fuel rods 14, care must be taken to ensure that the crystal lattice arrangements of each mono-crystal rod are properly aligned in common directions for a given fuel element 13. Furthermore, though the fuel element 13 is shown in FIGURE 2 as having a circular configuration, the fuel element may assume any other configuration without in any way departing from the invention.

The term "metal," as used throughout this specification in connection with sputtered fuel elements, is herewith defined as including any and all atomic elements capable of exhibiting the sputtering phenomenon. Also, the term "fuel element" is intended to mean a device including any such metals and any such atomic elements capable of being sputtered.

The fuel element 13 serves as the cathode of a gas discharge system. The axis of the fuel element 13 is directed towards the open end of the engine housing 12, so as to present a smooth cathode face 26 to bombarding ions which sputter the cathode.

In close proximity to the cathode face 26 is an anode 15, here shown in, but not limited to, the shape of a ring. A suitable D-C electrical power supply 16 has its negative terminal electrically connected via a lead 17 and a stationary contact 18 that is slidable on the fuel element 13. The positive terminal of the power supply 16 is electrically connected via the lead 19 and an "on-off" power switch 20, to a magnetic field generating solenoid 21 which is inserted in series with the anode 15. A resistor may be provided in shunt with the solenoid 21 for bypassing the main "sputtering current" so the magnetic field can be varied.

A controlled amount of gas in introduced into the space between the cathode face 26 of the fuel element 13 and the anode 15, and an electrical discharge is established between the anode and the cathode to ionize the gas. The gas is admitted to the anode-cathode space by means of a suitable inlet, shown as a conduit 22 which includes a control valve 23.

The ionizing electrical discharge established between the anode 15 and the cathode face 26 produces a plasma 24 separated from the cathode face 26 by a cathode sheath 25 often referred to as the "Langmuir dark space." The plasma 24 is essentially neutral and is composed of an equal number of positive ions and electrons or, where doubly charged ions are involved, these are matched with electron pairs. However, plasma electrons are repelled at the edge of the cathode sheath 25, and, therefore, the cathode sheath is composed solely of positive ions, no ionization or recombination taking place within this region. The bombarding ions from the plasma 24 diffuse to the cathode sheath 25, where they are accelerated into the cathode face 26 of the fuel element 13. The sputtering of the cathode face 26 causes the surface crystal lattice structure to preferentially eject neutral atoms and thereby produce the neutral atom beam 27. The ejected atom beam 27 produces the desired thrust and streams through the anode region as it exits from the housing 12.

During the time that the cathode face 26 of the metal fuel element 13 is being sputtered, there are some slower ejected atoms diffusing through the cathode sheath 25 into the plasma 24. These slow atoms are susceptible to ionization by colliding with electrons within the plasma 24. The metallic ions produced in this way are then accelerated back into the cathode face 26, whence they came, to further enhance the sputtering action. Hence, the slower atoms of the sputtered atom beam 27 are used to resputter the cathode face 26 and, in so doing, become deposited upon the fuel element 13 to be subsequently again sputtered themselves. In this manner, if the metal selected for the fuel element 13 is such that a large number of slow atoms are so ionized, the electrical discharge may be maintained by these atoms alone. In such an instance, no additional gas is required from the inlet 22 and use of a supplementary gas supply is limited solely to starting operation.

The aforedescribed embodiment, wherein the fuel element 13 is sputtered with its own atoms, proves to be a most efficient operational arrangement for the engine 11 of FIGURE 1. The reason for this is that maximum energy transfer during impact between particles occurs when the impacting and impacted particle masses are most nearly equal, a condition ideally approached by bombarding a metal crystal with its own ejected particles. The latter logically follows from the maximum energy transfer equation:

$$E_m = \frac{4 m_1 m}{(m_1 + m_2)^2} \qquad (1)$$

where:

$E_m$ is the energy transferred,
$m_1$ is the mass of the impacted particle, and
$m_2$ is the mass of the impacting particle.

Regarding the process of resputtering the fuel element 13 with its own ejected atoms, it should be noted that the density of the plasma 24 is such as to have minimal attenuating effect upon any of the ejected neutral particles forming the beam 27, except those having energy levels of thermal order. The bulk of the neutral particles forming the beam 27 travel at velocities which are several orders of magnitude above those occurring at thermal levels and, hence, traverse the plasma 24 so rapidly as to incur minimum probability of collision with plasma particles.

The aforedescribed resputtering technique for producing neutral particle exhaust beams in outer space also provides a means for lowering the total mass necessary for beam production. Since the ions can be reionized and used again, after being neutralized at the cathode face 26, there is a limited loss in the gas itself. Moreover, in the embodiment of the invention shown in FIGURES 1 and 2, since the beam products are taken from the solid state, no container or fluid compression device is required.

The diffusion of gas out of the open end of the engine housing 12 is prohibitive unless other factors are operating to stop the flow. However, once the gas has been partially ionized to produce the plasma 24, it is possible to magnetically confine the ions and electrons to the discharge region between the anode 15 and the cathode face 26. In this regard, a small magnetic field 28 is generated by current passing through the coils of the solenoid 21. This magnetic field provides an axial "pinch" effect which acts as a mirror to deflect charged particles away from the open end of the engine housing 12. Moreover, since the exhaust beam 27 is comprised only of neutral particles, the magnetic field 28 has no effect upon the beam.

The magnetic field not only serves to confine the plasma 24 to the anode-cathode space, but also provides means for maintaining a plasma layer of even density across the bombarded cathode face 26. In this regard, the shape and strength of the magnetic field may be selected to impart any desired shape to the plasma 24. Therefore, other magnetic field producing configurations than the solenoid 21 may be utilized for such purposes without departing from the scope of the invention. However, the embodiment shown in FIGURE 1 has proved to be extremely efficient since the coils of the solenoid 21 are in series with the anode 15 and, therefore, the electrical bombardment current flowing from the anode 15 to the cathode face 26 also passes through the solenoid to generate the plasma confining electromagnetic field 28.

The magnetic field 28 is also instrumental in increasing the probability of ionizing collisions by causing electrons within the plasma 24 to trace a helical path. The likelihood of such electrons encountering other particles is thereby increased. Moreover, the magnetic field 28 and the cathode sheath 25 provide a combination of magnetic and electrostatic mirrors for such ionizing electrons. In this regard, electrons are reflected from the edge of the cathode sheath 25 immediately adjacent the plasma 24. These electrons, moving at high velocity, rebound from the sheath boundary and are directed back into the plasma 24, where they encounter the magnetic field 28 to again turn them. These combined magnetic and electrostatic reflection phenomena also serve to increase the path traversed by the ionizing electrons and, hence, significantly enhance the probability of ionizing collisions.

Since the confinement of gas to the anode-cathode space is important, diffusion of gas into the portion of the housing 12 behind the cathode face 26 of the fuel element 13 is minimized by means of a baffle 29 surrounding the outer periphery of the fuel element 13. Appropriate gasketing, not shown but well known in the art, may be provided between the baffle 29 and the outer surface of the fuel rod 13 to further prevent gas leakage behind the baffle.

Because the fuel element 13 in FIGURES 1 and 2 is in the form of a solid rod whose crystal surface is gradually eroded back due to sputtering, means must be provided to move the fuel element forward and thereby maintain constant cathode-anode spacing. To accomplish this, the fuel element 13 is slidably mounted within a sleeve 30 whose axis is concentric with that of the fuel element. The sleeve 30 may be suitably secured and aligned within the housing 12 by any well known means, such as the spider networks 31 and 32.

A piston 33 is also mounted within the sleeve 30 and abuts the rear surface of the fuel element 13 at 40. If so desired, the piston 33 may be fixedly secured to the fuel element 13 at 40 to enable the fuel element to be retracted as well as moved forward in the sleeve 30. The piston 33 carries a gear rack 34 along its lower longitudinal surface, and clearance for this rack is provided in the outer wall of the sleeve 30 by means of a slot 38. The rack 34 is engaged by a pinion gear 35 located within a compartment 41 of a housing 39 incorporated into the wall of the sleeve 30.

Rotation of the pinion gear 35 to move the piston 33 and fuel element 13 forward in the sleeve 30 is accomplished by a suitable driving means, as by a driving motor 36. The speed of the motor 36 is under the control of a timing network 37 whose operating parameters may, in turn, be either manually controlled or adjusted by means of an appropriately derived control signal. In this regard, the rate at which the fuel element 13 is eroded back will be known for a given fuel element material, gas, gas pressure, and power supply voltage. Hence, for a specified set of operating conditions, the time network 37 may be adjusted to cause the piston 33 and fuel element 13 to move forward at a rate which is equal to that with which the cathode face 26 of the fuel element is eroded back. In this manner, the cathode-anode spacing may be maintained constant.

The braking action of the driving means 36 is sufficient to resist the propulsive forces of the engine which tend to drive the fuel element 13 inwardly of the sleeve 30 against the piston 33. As will be apparent, any suitable drive means may be employed to position fuel element, and to prevent undesired retraction thereof, e.g., hydraulic, pneumatic or electro-mechanical.

On of the primary advantages of the neutral particle engine 11 in FIGURES 1 and 2 resides in the capability of such a system for adaptation to a wide range of thrust and specific impulse requirements. In this regard, the thrust and specific impulse of the engine may be selectively controlled by varying the energy or momentum of the impinging particles. This is simply accomplished by varying the accelerating potential between the anode 15 and the cathode face 26. The thrust may also be controlled by varying the current between the anode 15 and the cathode face 26, this current being a function of both voltage and gas pressure.

A primary consideration in the design of a specific neutral particle engine 11 to meet specified thrust-specific impulse requirements is the selection of a cathode material for the fuel element 13, as well as the choice of a gas for providing the bombarding ions. Insofar as materials for the fuel element 13 are concerned, higher particle ejection velocities, and hence higher values of specific impulse, are obtained with the lighter elements such as beryllium, sodium, aluminum, vanadium, nickel or the like. On the other hand, higher thrust with lower values of specific impulse may be obtained from a fuel element comprising the heavier elements, such as molybdenum, tungsten, silver, or the like. Hence, the atomic number of an element to be used for the fuel element 13 is somewhat indicative of the thrust and specific impulse produced by an engine embodying a fuel element of that material.

In one engine design for a propulsive device producing approximately 1 lb. of propulsive force and having a specific impulse in the range of 2,000–3,000 sec., a fuel element of atomic mass 23 (sodium) has a cathode face of 100 cm.$^2$ surface area. This cathode face is subjected to a bombarding ion current of about 400 ma./cm.$^2$ to produce a sputtering yield of approximately 10 atoms/ion. The thrust in such a system may be varied primarily by altering the atoms/ion sputtering yield of the crystal, whereas the specific impulse of the system will vary directly with the average ejection velocity of the ejected atoms. The aforedescribed engine is characterized by a fuel consumption of approximately 3.8 lbs. for a continuous 24-hour period of operation. Starting and stopping of engine operation is readily accomplished by manipulation of the switch 20 in FIGURE 1 to control the application of electrical power to the system.

The invention also embraces unique means wherein increased atoms/ion yield and neutral particle ejection velocities, and hence the thrust and specific impulse of the propulsive system, are obtained by bombarding the surce of the fuel element with an ion beam which impinges obliquely upon the fuel element surface, as opposed to an impingement normal to the fuel element surface. Referring to FIGURE 3, there is shown a fuel element 43 having a cathode face 44 presenting a surface which is oblique to the direction of the incoming ion beam through cathode sheath 50. The arrangement of FIGURE 3 includes a conventional anode 45 which is electrically connected via a lead 47 to the positive terminal of a D-C power source 46. The negative terminal of the power source 46 is electrically connected via a lead 48 to the fuel element 43.

In the same manner as previously set forth in connection with the engine embodiment of FIGURE 1, an electrical discharge is established through an appropriate gas introduced between the anode 45 and the cathode face 44. As a result of this discharge, the cathode sheath 50 and a plasma 49 are produced. A magnetic field (not shown) may be used to confine the plasma 49. Positive ions within the plasma 49 diffuse to the boundary 51 between the plasma and the cathode sheath 25, where they are rapidly accelerated and obliquely impinge upon the cathode face 44 of the fuel element 43.

It will be observed in FIGURE 3 that the cathode sheath-plasma boundary 51 is not parallel to the cathode face 44 as it was for the engine embodiment of FIGURE 1. Since bombarding ions are always accelerated perpendicular to the sheath edge 51, manipulation of the shape of the sheath edge provides an expedient for causing oblique impingement of the bombarding ions upon the cathode face 44. The production of a non-parallel sheath edge, indicated by the dotted line 51, may be obtained by varying the thickness of the cathode sheath 50 so that the plasma 49 is spaced further from the cathode face 44. In this regard, the thickness of the cathode sheath 50 increases with increasing voltage and decreases with increasing current. For example, with mercury gas in the cathode-anode space, a potential difference of approximately 5,000 volts, and a current density of 100 ma./cm.² establish a cathode sheath about 1 centimeter thick. The current density for a given potential difference is a function of the gas pressure which, in turn, is a function of the rate at which gas is supplied to the cathode-anode space.

If the cathode sheath 50 were extended all the way to the anode 45, ions would stream directly from the anode to the cathode face 44, and oblique impingement of the bulk of the ion beam would be automatically accomplished regardless of the configuration of the cathode face. However, where the cathode sheath 50 does not extend to the anode 45, one or more additional negative electrodes (not shown), which may take the form of a single wire filament parallel to the cathode face 44, may be electrically connected to the fuel element 43 and physically spaced from the cathode face to alter the electric field configuration and thereby cause oblique impingement of ions upon the cathode face. In this latter instance, the thickness of the cathode sheath 50 should be large with respect to the spacing between the cathode face 44 and any supplementary negative electrodes.

It will be noted in FIGURE 3 that the direction of the ejected neutral atom beam 52 is neither perpendicular to the cathode face 44 nor parallel to the bombarding ions passing through the cathode sheath 50. In this regard, the velocity of neutral particle ejection, as well as the number and direction of ejected atoms, is determined by the orientation of the fuel element 43 and the crystal lattice arrangement presented to the incoming bombarding ions. Generally, sputtering results in ejection of surface atoms in the direction of closest packing of the crystal lattice, i.e., in the direction of close-packed rows, such as the rows 53 of the fuel element 43. The direction of the ejected neutral atom beam 52 remains in the direction of the close-packed rows 53 regardless of the angle of incidence of the ion beam used to sputter the cathode face 44.

Hence, the direction of thrust is predicted solely by the position of the fuel element 43 and is essentially independent of the path traversed by the ion beam in arriving at the cathode face 44.

As previously indicated, the maintenance, or at least starting, of an electrical discharge between the cathode face of the fuel element and the anode, requires the introduction of a gas into the anode-cathode space. However, and as previously explained, it is not necessary that a separate gas supply be used, but that an electrical discharge may rely upon gaseous material issuing directly from the fuel element itself. This gaseous material may be either the slower moving ejected atoms from the fuel element itself, or may involve emission from other foreign elements which have been deliberately "seeded" into the fuel element structure.

FIGURE 4 shows a cylindrical fuel element 63 embodying a plurality of individual monocrystal metal rods 64, shaped and fitted together to form the larger fuel element. Embedded in the interstices between the adjacent monocrystal rods 64 (or, if desired, in holes directly within the rods 64 themselves) are a plurality of rods 65, coextensive with the fuel element 63. The rods 65 are comprised of an element or elements having high vapor pressure and low ionization potental atoms, such as cesium, mercury, lithium, or the like. The fuel element structure of FIGURE 4 obviates any need for the additional gas supply shown in the engine embodiment of FIGURE 1. In this regard, the substitution of the fuel element 63 in FIGURE 4 for the fuel element 13 in FIGURE 1 would eliminate the need for supplementary gas storage expedients and the gas inlet 22, with consequent reduction in total system weight.

Referring now particularly to FIGURES 5, 6 and 7, there is shown a portion of a neutral particle engine, in accordance with the present invention, which may be operated from an A-C power source and eliminates the need for a special anode electrode as required for D-C operated engines. The A-C engine comprises a pair of parallel fuel elements 73, 74 separated by a suitable electrical insulator 75. Though the fuel elements 73, 74 and the insulator 75 are shown in FIGURE 6 to be rectangular in cross section, any appropriate configurations may be utilized.

The fuel elements 73, 74 are electrically connected to an A-C power source 76 via leads 77 and 78, respectively. The fuel rods 73, 74 are beveled at their forward ends to provide diverging surfaces 79, 80. The application of an A-C potential difference across the fuel elements 73, 74 establishes an electrical discharge through a gas which is suitably introduced between the surfaces 79, 80. A plasma 81 is produced in the space between the surfaces 79 and 80, and, by virtue of the alternating voltage.

For each half cycle during which the surface 79 is negative, and therefore a cathode, a cathode sheath 82 forms adjacent this surface. During this same half cycle, the fuel element 74 behaves as an anode to maintain the electrical discharge. During the next half cycle, the situation is reversed, and the surface 80 becomes a cathode surface having a cathode sheath 83 adjacent thereto.

The purpose of the electrical insulator 75 is to confine the electrical discharge between the fuel elements 73 and 74 solely to the surfaces 79 and 80, as opposed to arcing between points along the longitudinal periphery of the fuel elements. The plasma 81 established by the electrical discharge is confined by a magnetic field 84, which may be generated substantially in the same manner previously described for the engine embodiment of FIGURE 1.

FIGURE 7 depicts a portion of the fuel element 73 of FIGURE 5, and shows the crystal structure of the fuel element, as well as the ejected neutral particle beam 86. The positive ions from the plasma 81 diffuse to the edge of the cathode sheath 82 where they are accelerated into the surface 79 of the fuel element 73. The atoms ejected from the surface 79 form a thrust-producing beam 86 whose direction is the same as the direction of closest packing for the fuel element crystal lattice. This direction of closest packing is along the line of close-packed atom rows 85 within the fuel element 73.

The closest packing crystal lattice direction of the fuel element 74 in FIGURE 5 is parallel to that of the fuel element 73. In this manner, each of the fuel elements 73, 74 alternates each half cycle in producing a parallel neutral particle beam.

Referring to FIGURE 8, a neutral particle engine of my invention is schematically depicted which enables thrust vectoring of the propulsive device to be readily accomplished. An engine casing 100 is provided for housing a plurality to fuel elements 101, 102, 103. Each of these fuel elements 101, 102, 103 is provided with its own ionizing anode 104, 105, 106, respectively. Moreover, the fuel elements 101, 102, 103 are also provided with individual solenoids 107, 108, 109, respectively, for generating plasma-confining magnetic fields.

The operation of the system of FIGURE 8 to sputter any one of the fuel elements 101, 102, 103 is independent of its operation to sputter any other fuel element and is accomplished substantially in the manner described for the engine embodiment of FIGURE 1. However, the direction of the close-packed rows for each of the fuel elements 101, 102, 103 is different from the closest packing lattice directions of the other fuel elements. Hence, the close-packed rows 112 of the fuel element 102 are oblique to the close-packed rows 111 of fuel element 101 and the close-packed rows 113 of fuel element 103. In this manner, the resultant thrust direction for the engine is determined by selection of the specific fuel element or combination of fuel elements to be sputtered.

The principle of thrust vectoring by orientation of the direction of closest packing of the crystal lattice may be extended to any number of fuel elements. Moreover, the fuel elements need not assume the side-by-side relationship shown in FIGURE 8, but may be arranged in any convenient space relationship with respect to one another.

Referring now to FIGURE 9, there is shown a neutral particle engine, in accordance with the present invention, which utilizes fuel in liquid form. The engine of FIGURE 9 includes a cylindrical pipe 200, preferably fabricated of a dielectric or other material that is non-reactive chemically with a liquid fuel 202 which is conveyed through the pipe to a porous plug 204 at the end of the pipe where sputtering of the fuel occurs. The fuel 202 may be any liquid material capable of being sputtered, such as mercury, cesium, gallium, or the like, and the porous plug 204 may be of any appropriate material which is non-reactive chemically with the liquid fuel, e.g., porous tungsten, dielectric materials or glass. The liquid fuel 202 passes through the plug 204 at a controlled rate to provide a thin film or coating of fuel atoms 206 upon the outer surface of the plug which is subjected to bombardment by positive ions 208 from the ion plasma 210. As a result of ion bombardment of the liquid fuel 202, the fuel sputters neutral atoms 212.

Although the ejection of neutral atoms 212 in the embodiment of FIGURE 9 is in a substantially symmetrical 180° hemispherical pattern, the resultant propulsive force is essentially perpendicular to the fuel surface layer being bombarded, i.e., parallel to the axis of the pipe 200.

The liquid fuel 202 is fed to the pipe 200 from a suitable liquid fuel supply 214 via a pump 216 under the control of an appropriately programmed timing network 218 similar to the timing network 37 previously referred to in connection with the embodiment of the invention shown in FIGURE 1.

A negative electrode 220 extends through the wall of the pipe 200 into the liquid fuel 202 at the end of the pipe remote from the plug 204.

If desired, the porous plug 204 may be dispensed with, and the diameter of the pipe 200 reduced in size to the point where surface tension alone will provide a liquid fuel surface at the open end of the pipe adjacent the sputtering site.

FIGURE 10 illustrates an embodiment of the invention wherein a gas fuel is employed. The engine includes a cylindrical pipe 300 of a material which is preferably both a good heat insulator and dielectric. A refrigerant or cryogenic fluid 302 is contained within the pipe 300 to cool a cold finger 304 within the end of the pipe adjacent the sputtering site. The cold finger 304 is a plug of good heat conducting material, such as copper, aluminum, silver, tungsten or the like, which is maintained at proper cathode potential by a negative electrode 306 extending through the wall of the pipe 300 into the plug body.

The fuel element which is sputtered comprises a layer of adsorbed gas atoms 308 which condense on the outer surface of the cold finger 304. The adsorbed atom layer is bombarded by positive ions 310 from the plasma 312 to cause sputtering of the fuel surface resulting in the ejection of neutral atoms 314. Again, as in the case of the engine embodiment shown in FIGURE 9, the ejection occurs in a 180° symmetrical hemispherical pattern, with a resultant propulsive force essentially perpendicular to the bombarded fuel surface.

The gas fuel may be any gas capable of being sputtered, such as xenon, argon, cesium vapor or the like, and is the same gas which is used to generate the ion plasma 312. In this connection, the gas is admitted to the anode-cathode space and the region of the exposed surface of the cold finger 304 by means of a suitably positioned conduit 316 which receives the gas from a gas fuel supply 318 via pump 320. The fuel flow rate is varied by subjecting the pump 320 to the control of an appropriately programmed timing network 321 similar to the timing network 218 in FIGURE 9 and the timing network 37 in FIGURE 1.

The neutral particle propulsion device provided by the present invention harnesses the sputtering phenomenon, heretofore considered a deleterious condition in electric engines, to produce a simplified structural arrangement capable of a wide performance range. In this regard, charge buildup, neutralization requirements, and undesired component erosion are eliminated. In addition, the engine is compact and highly efficient. Hence, the present invention satisfies a critical need in the rapidly advancing state of space propulsion technology.

It will be apparent from the foregoing that, while particular forms of the invention have been illustrated and described, various modifications can be made without departing from the spirit and scope thereof. Accordingly, it is not intended that this invention be limited, except as by the appended claims.

I claim:

1. A propulsive device comprising: an engine housing; a fuel element within said engine housing, said fuel element composed of a material capable of being sputtered, said fuel element having an exposed surface; and means for bombarding said exposed surface of said fuel element with high energy particles and for directing neutral particles ejected from said surface of said fuel element in a thrust-producing beam from said housing.

2. A propulsion system comprising:
 a fuel element composed of a class of materials which when bombarded on an exposed surface thereof by high energy particles emits high velocity neutral particles from said surface;
 means for presenting an exposed surface of said fuel element;
 means for generating and directing high energy particles against said exposed surface to cause said surface to sputter and eject thrust-producing neutral particles; and
 means for replenishing the material of said fuel element at said exposed surface as said exposed surface is sputtered.

3. A system as set forth in claim 2, wherein said fuel element is a liquid.

4. A system as set forth in claim 2, wherein said fuel element is a gas.

5. An arrangement for the production of propelling rust comprising in combination:
a fuel element of at least one monocrystal metal rod, said fuel element presenting at least one crystal surface for ion bombardment;
means for generating and directing an ion beam against said crystal surface to cause said surface to erode by ejecting thrust-producing atoms; and
means to feed said fuel element to said ion beam as said crystal surface is eroded.

6. A propulsive device comprising:
a flight vehicle having an opening therein;
a solid state crystal fuel element mounted within said opening, said element having a crystal lattice direction of closest packing, said element having at least one crystal surface oriented to receive an impinging ion beam;
means for bombarding said crystal surface with positive ions to cause said surface to erode by the ejection of thrust-producing atoms; and
means to feed said fuel element to said positive ions at a rate equal to that with which said crystal surface is eroded.

7. A propulsive device as set forth in claim 6, wherein said crystal lattice direction of closest packing of said fuel element is in the desired direction of thrust.

8. A propulsive system comprising:
a fuel element formed of abutting coextensive monocrystal metal rods having their crystal lattice directions of closest packing oriented in a common direction, said fuel element presenting at least one crystal surface for ion bombardment; and
means for obliquely impinging an ion beam against said crystal surface to cause said surface to preferentially eject thrust-producing neutral atoms.

9. A neutral particle engine comprising in combination:
an engine housing;
a crystalline fuel element mounted within said housing and presenting at least one crystal surface for sputtering;
an anode adjacent said crystal surface;
means to introduce an ionizable gas between said anode and said crystal surface; and
means to establish an electrical discharge through said gas between said anode and said crystal surface, whereby said crystal surface is bombarded by positive ions to cause said surface to sputter and eject a thrust-producing neutral atom beam.

10. A neutral particle engine as set forth in claim 9, wherein said means to introduce a gas is a high vapor pressure material embedded in said fuel element.

11. A neutral particle space propulsion device comprising:
a vehicle housing having an opening therein;
a fuel element in the form of a metal crystal rod mounted within said opening, said fuel element presenting a crystal surface for sputtering;
an anode within said housing positioned near said crystal surface;
means for introducing a controlled quantity of gas between said anode and said crystal surface;
means for establishing an electrical discharge current between said anode and said crystal surface to ionize said gas;
means for generating a magnetic field to confine said gas to said housing in its ionized state; and
means to feed said fuel element at a rate equal to that with which said crystal surface erodes due to sputtering.

12. The neutral particle device of claim 11, wherein said magnetic field for confining the ionized gas is generated by said electrical discharge current.

13. A fuel element for a neutral particle propulsive engine comprising:
a plurality of monocrystal cylindrical metal rods, each of said rods being coextensive with and abutting one another to provide a close fitting cylindrical mass, the directions of closest packing of each monocrystal rod being aligned to provide a common direction of closest packing for all of said rods forming said cylindrical mass.

14. A fuel element as set forth in claim 13, wherein a plurality of rods of high vapor pressure material are embedded in said cylindrical mass, said rods of high vapor pressure material being coextensive with said monocrystal rods throughout the length of said fuel element.

15. In a neutral particle propulsive system, the combination comprising:
a crystalline metal fuel element having a surface to be sputtered;
an anode;
a gas between said anode and said surface;
means to establish an ionizing electrical discharge through said gas between said anode and said surface to produce a cathode sheath of positive ions adjacent said surface; and
means to vary the thickness of said cathode sheath to cause oblique impingement of said positive ions upon said surface.

16. The system of claim 15, wherein the crystal lattice direction of closest packing for said fuel element is oblique to the direction of impingement of said positive ions.

17. In a thrust-producing neutral particle device, the arrangement comprising:
a housing;
a pair of parallel metal crystal fuel rods mounted within said housing, each rod having a surface to be sputtered, said surfaces confronting each other;
means to produce a gas between said surfaces;
an electrical insulator positioned between said fuel rods; and
a source of A-C voltage electrically connected between said fuel elements for causing said gas to be ionized and said surfaces of said fuel elements to be alternately bombarded by positive ions to cause ejection of neutral particle thrust-producing beams by said surfaces.

18. A thrust-producing neutral particle device as set forth in claim 17, wherein the crystal lattice directions of closest packing for both fuel rods are parallel.

19. A thrust vectoring arrangement for a neutral particle apparatus comprising:
a plurality of metal crystal fuel rods, each fuel rod presenting a surface to be sputtered, the crystal lattice direction of closest packing for each fuel rod being oblique to the crystal lattice direction of closest packing of at least one other fuel rod; and
means to selectively sputter the surface of at least one of said fuel rods to cause preferential ejection of thrust-producing neutral particles, whereby the selection of specific fuel rods to be sputtered determines the resultant thrust vector.

20. A method for controlling the direction of thrust produced by a neutral particle engine comprising the steps of:
sputtering the surface of a crystal rod having a crystal lattice direction of closest packing by bombarding said surface with ions, and directing the said crystal lattice direction of closest packing of said rod in the desired direction of thrust.

21. A method for controlling the direction of the thrust vector for a neutral particle engine comprising:
sputtering the surface of a crystal rod having a crystal lattice direction of closest packing by bombarding said surface with ions, and positioning said rod so that the said crystal lattice direction of closest packing of said rod is in the desired direction of thrust.

22. A method of propulsion comprising:
bombarding a surface of a fuel material capable of being sputtered with particles of sufficient energy to cause ejection of a neutral particle beam from said surface; directing said neutral particle beam in the desired direction of thrust; and
replenishing said fuel material at said surface as said surface is sputtered.

References Cited

Journal of Applied Physics, volume 26, No. 8, August 1955, pages 1056 and 1957.

Physical Review, volume 102, No. 3, May 1, 1956, pages 690–703.

Physical Review, volume 114, No. 5, June 1, 1959, pages 1270–1272.

Journal of Applied Physics, volume 30, No. 11, November 1959, pages 1762–1765.

Journal of Applied Physics, volume 31, No. 8, August 1960, pages 1392–1397.

CARLTON R. CROYLE, *Primary Examiner.*

MARK NEWMAN, *Examiner.*